(12) United States Patent
Wang et al.

(10) Patent No.: US 8,045,622 B2
(45) Date of Patent: Oct. 25, 2011

(54) SYSTEM AND METHOD FOR GENERATING DECODED DIGITAL VIDEO IMAGE DATA

(75) Inventors: Jason Naxin Wang, San Jose, CA (US); Ikuo Tsukagoshi, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1225 days.

(21) Appl. No.: 11/787,808

(22) Filed: Apr. 17, 2007

(65) Prior Publication Data
US 2007/0189395 A1    Aug. 16, 2007

(51) Int. Cl.
*H04N 7/18* (2006.01)

(52) U.S. Cl. .......... 375/240.25; 375/240.13; 375/240.21

(58) Field of Classification Search ... 375/240.1–240.29
See application file for complete search history.

*Primary Examiner* — Andy Rao
(74) *Attorney, Agent, or Firm* — Finnegan, Henderson, Farabow, Garrett & Dunner, LLP (57) ABSTRACT

Methods and systems are disclosed for decoding image data including I-picture, P-picture, and B-picture encoded data. A method includes receiving encoded image data and selectively performing a modified inverse discrete cosine transform (IDCT) process to generate output pixel array blocks at a lower resolution than the resolution of the received image data. The image data can be 8×8 pixel array blocks, which are used to produce lower resolution pixel array blocks such as, for example, 4×8 or 4×4 pixel array blocks. In certain instances, after the IDCT process is performed, the resulting pixel data is up-sampled before motion compensation is performed. Furthermore, in certain instances, the resulting pixel data is subjected to motion compensation and scaled to display size prior to display.

11 Claims, 10 Drawing Sheets

SYSTEM AND METHOD FOR GENERATING DECODED DIGITAL VIDEO IMAGE DATA

RELATED APPLICATION

This application claims the benefit of U.S. Provisional Application No. 60/254,572, entitled "System and Method for Generating Decoded Video Image Data," filed Dec. 12, 2000, and U.S. patent application Ser. No. 10/014,689, entitled "System and Method for Generating Decoded Digital Video Image Data," filed Dec. 11, 2001, each of which is herein incorporated by reference in its entirety for all purposes.

FIELD OF THE INVENTION

The present invention relates to a system and method for generating decoded digital video image data and, more particularly, a system and method having lower cost and higher performance.

DESCRIPTION OF RELATED ART

Digital consumer electronic devices such as camcorders, video cassette recorders (VCRs), digital video disk (DVD) players, and television receivers use video signals to record, store, and display video images. Since video signals, when first generated, constitute an enormous volume of data, it is common to use various methods for processing or "compressing" the data in video signals prior to transmission or storage. For example, one widely used compression system incorporates a standard devised by the Motion Picture Experts Group popularly known as MPEG-2. In particular, video signals processed according to the MPEG-2 standard are used for transmission of digital broadcast television signals in the United States. Television receivers desiring to receive and display such compressed video signals incorporate a decoder to process or "uncompress" the video signals to produce pictures (i.e., frames or fields) for display on a television screen.

Digital television broadcast receivers are available in a variety of screen sizes to appeal to various segments of the television receiver market. For example, some potential customers are interested in the ultimate highest quality image for a large screen home theater. Other consumers desire to view digital television signals on lower cost receivers for use in, for example, kitchens or bedrooms. Such receivers typically have relatively small screens. Since small screens are incapable of generating a picture having the resolution of which some digital TV formats are capable of providing, such receivers cannot justify the cost of providing a decoder producing signals of full format resolution. However, prior art systems and methods, while exhibiting lower cost, often did not provide signals of sufficient resolution to produce the full picture quality of which even a small screen size is capable.

Another application for low cost systems and methods for decoding digital video image data is to provide special effects, such as "split-screen" and "picture-in-picture," in which two or more programs are simultaneously viewed on different portions of the screen. Each separate program generally requires its own decoder. Additionally, since only a portion of a full screen is used for display, decoders used only for such special features need not generate decoded digital signals having the same full format resolution as the full screen.

It is therefore desirable to provide methods and systems for generating decoded digital image data having lower cost but still exhibiting sufficient resolution such that picture quality is limited only by size and characteristics of the display device.

SUMMARY OF THE INVENTION

In accordance with the purpose of the present invention, as embodied and broadly described, the invention provides methods and systems for decoding image data including I-picture, P-picture, and B-picture encoded data. A method comprises receiving encoded image data and selectively performing a modified inverse discrete cosine transform (IDCT) process to generate output pixel array blocks at a lower resolution than the resolution of the received image data. In one embodiment, the image data is 8×8 pixel array blocks, which are used to produce lower resolution pixel array blocks such as, for example, 4×8 or 4×4 pixel array blocks. In some embodiments, after the IDCT process is performed, the resulting pixel data is up-sampled before motion compensation is performed. In other embodiments, the resulting pixel data is subjected to motion compensation and scaled to display size prior to display.

DESCRIPTION OF THE DRAWINGS

The accompanying drawings, which are incorporated in and constitute a part of the specification, illustrate present embodiments of the invention and, together with the general and detailed descriptions, serve to explain the principles of the invention. In the drawings.

DESCRIPTION OF THE EMBODIMENTS

In the following detailed description of embodiments consistent with the invention, reference is made to the accompanying drawings that form a part thereof, and which show by way of illustration specific embodiments in which the invention may be practiced. These embodiments are described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Referring now to the drawings, in which like numerals represent like elements throughout the several figures, embodiments of the present invention will now be described.

Figure 1:
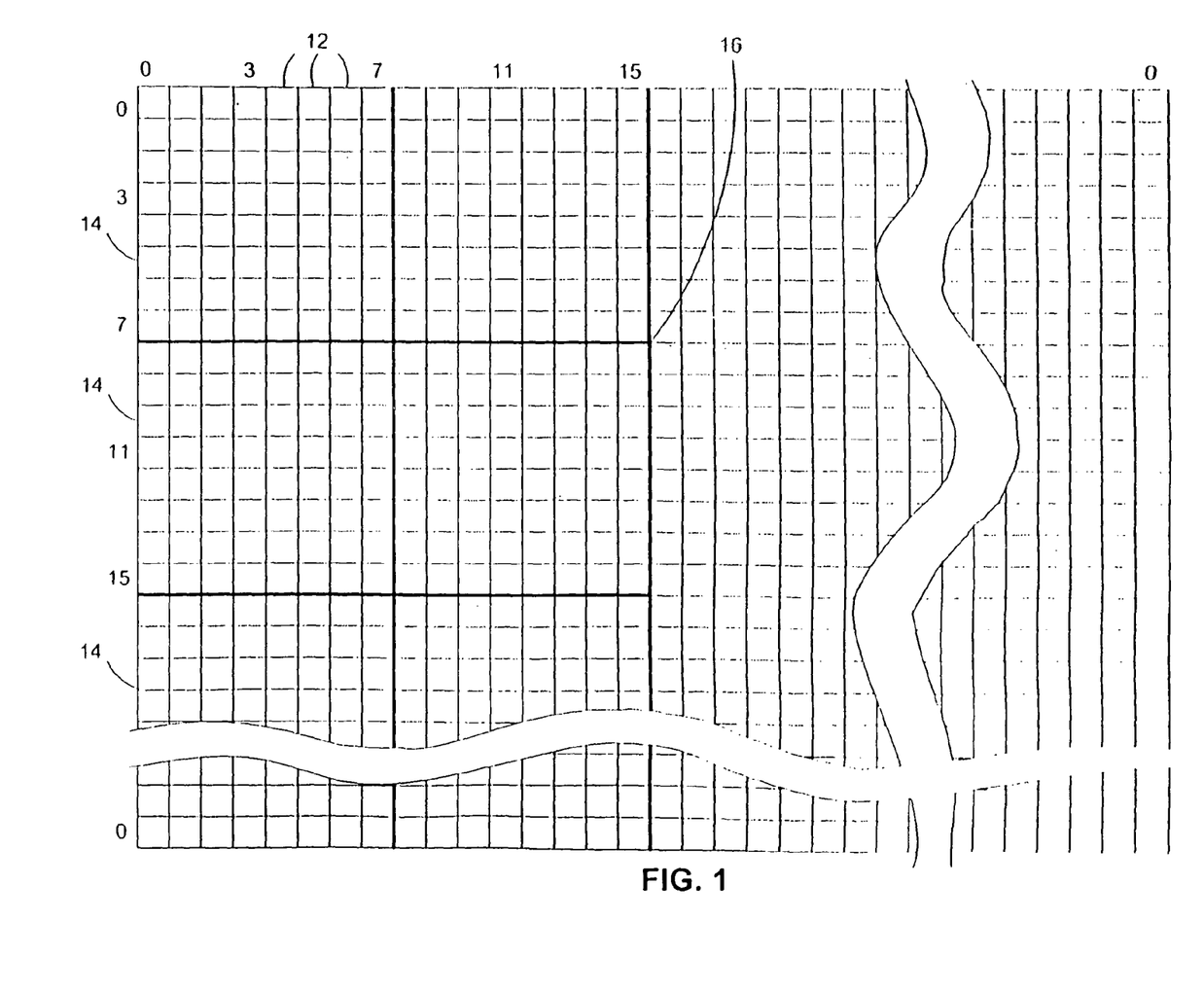
FIG. 1 is a diagram of an image which can be encoded as digital data.

FIG. 1 indicates how an image may be depicted as a large number of picture elements, or "pixels," 12 arranged in a rectangular matrix of m columns and n rows. For example, in one digital television format currently broadcast in the United States a pixel array describing a picture consists of 1920 columns and 1080 rows. The MPEG-2 standard provides that the pixel array can be separated into a plurality of 8×8 pixel groups known as "blocks" 14 and 16×16 pixel groups 16 known as "macroblocks."

An imager then samples the picture, for instance by scanning the picture, thereby converting the two-dimensional picture into a one-dimensional waveform. The imager scans a line from left to right, retraces from right to left, and then scans the next line starting from left to right. The number of scan-lines effects resolution, flicker and bandwidth. One type of scanning is progressive scanning. Progressive scanning produces a frame in which the raster lines are sequential in time. Another type of scanning is interlaced scanning. Interlaced scanning produces an interlaced frame comprised of two fields which are sampled at different times. That is, interlaced scanning allow lines to be scanned alternately in two interwoven rasterized lines. The MPEG standard provides two Picture Structures for interlaced frames, Field Pictures and Frame Pictures. Field Pictures consist of individual fields that are divided into macroblocks and coded whereas Frame Pictures consist of interlaced fields that are divided into macroblocks and coded. Furthermore, the MPEG standard provides two macroblock DCT modes for Frame Pictures, field mode and frame mode.

The MPEG-2 standard further provides that the macroblocks of each picture may be encoded using either "intra-coding" or "inter-coding." An intra-coded block is coded using data present only in the block itself, without reference to any other block. In contrast, an inter-coded block is coded based on one or more reference blocks, derived from one or more blocks transmitted either previous to the block being encoded or following the block being encoded. Encoded data of an inter-coded block consists of difference information representing the difference between a block of the reference picture and a block of the picture being encoded.

In an "intra-picture" (called an "I-picture"), all the blocks are "intra-coded." A predictive-coded picture, or "P-picture" uses temporally preceding pictures for reference information. A bi-directionally predictive-coded pictures, or "B-picture," may obtain reference information from preceding or upcoming pictures, or both. The blocks in P- and B-pictures may be inter-coded or intra-coded, or both. Reference pictures for P- and B-pictures may be P- or I-pictures.

Video data processed according to the MPEG-2 standard is encoded using a discrete cosine transform (DCT) process, yielding a group of transform coefficients which are then quantized and subjected to variable length coding to produce a stream of encoded digital video data. The MPEG-2 digital video stream thus includes the quantized and encoded DCT transform coefficients, plus motion compensation information in the form of motion vector data, as well as quantizing stage size data. Details of the process by which video image data is encoded in the MPEG-2 standard are well known to those skilled in the art and will not be described further in detail.

Figure 2:
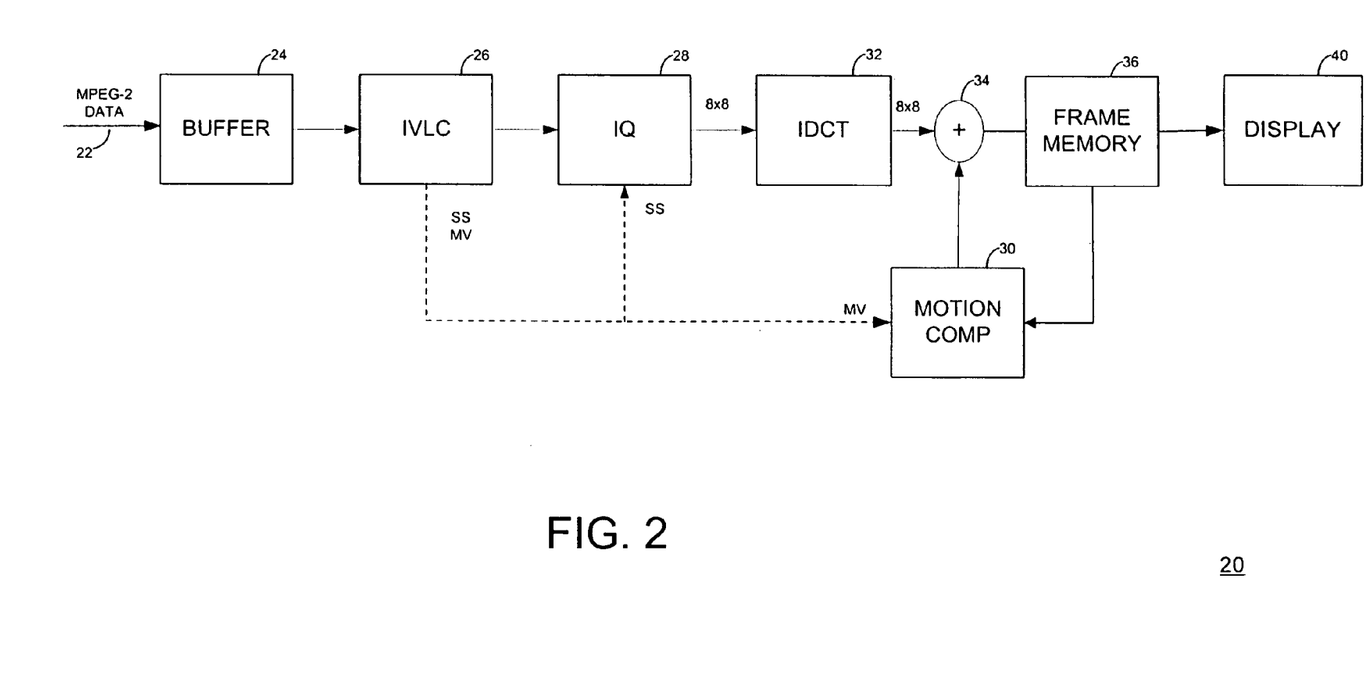
FIG. 2 is a block diagram of a conventional MPEG-2 decoder.

FIG. 2 is a functional block diagram of a conventional MPEG-2 decoder 20. As shown in FIG. 2, an encoded digital video signal 22 is supplied to an input buffer 24, where it is stored. The encoded digital video signal may include MPEG-2 data. The encoded digital video data representing blocks of a picture are read out from input buffer 24 and supplied to an inverse variable length coding ("IVLC") element 26, otherwise called a variable length decoding ("VLD") element. IVLC element 26 applies inverse variable length coding, also known as variable length decoding, to the incoming digital data for each block and supplies blocks of quantized transform coefficients to an inverse quantizing ("IQ") element 28. IVLC element 26 also extracts motion vector data ("MV") and quantizing stage size data ("SS") from the incoming data for each block.

IQ element 28 dequantizes each block of quantized transform coefficients in accordance with stage size data SS from IVLC element 26. IQ element 28 then supplies each resulting block of transform coefficients to an inverse discrete cosine transform ("IDCT") element 32. IDCT element 32 provides a decoded block of data that is supplied to an adder element 34.

The operation of adder element 34 depends on the type of picture of which the incoming block is a part. If the block is from an I-picture, it is intra-coded wherein the decoded data is complete in and of itself. Thus, element 34 supplies data from this intra-coded block directly to a frame memory 36. If the block is from a P-picture or a B-picture, the block may be inter-coded or intra-coded. If the block is intra-coded, the decoded data is complete in and of itself. Thus, element 34 supplies data from this intra-coded block directly to a frame memory 36.

If, on the other hand, the block is inter-coded, the incoming data represents only difference information between an image block of the picture currently being received and a particular block of a reference picture that the decoder has previously received and stored in frame memory 36. Motion compensation element 30 retrieves data of the block from one or more reference pictures stored in frame memory 36. Motion compensation element 30 retrieves data based on MV data. MV data includes vector data and other "tag" information, which may be used to specify a specific frame or picture associated with the vector data. For example, the tag information may indicate a particular reference picture for the vector data, which may specify a particular reference pixel within the reference picture. Specifically, vector data includes X, Y data specifying a position in an array. The reference pixel indicates where the motion compensation element 30 is to start loading the reference picture data. Vector data includes the position of the reference pixel based upon a particular pixel array resolution, e.g. a full resolution such as an 8×8 pixel array per block resolution. For instance, vector data such as (3.5,0) based on an 8×8 pixel array per block resolution, indicates that the motion compensation element 30 should start loading the 8×8 reference block at position (3.5, 0). The value 3.5 indicates an X pixel position in between a pixel at value 3 and a pixel at value 4, and the value 0 indicates the Y pixel position at row 0 of the array.

Motion compensation element 30 supplies the retrieved reference data to adder element 34. Adder element 34 then combines the reference block data from motion compensation element 30 with the incoming difference data from IDCT element 32 to form a complete block of the picture being received, and stores it in frame memory 36. When all blocks of the picture have been decoded, the digital data for the entire picture is output for display on a display device 40.

As is well known in the art, conventional digital television signals are generally decoded using a conventional system as shown in FIG. 2. A full resolution decoder will perform inverse DCT processing on all information received. For example, if the digital television signal was encoded using 8×8 pixel array per block, a full resolution decoder will perform decoding on 8×8 pixel array per block. As mentioned earlier, full resolution processing, however, is CPU-intensive, requires significant processing power, and is often unneeded when the resulting video signals are received and displayed on a device that will not display the full picture, such as a picture-in-picture screen.

Furthermore, a conventional decoder, as described in FIG. 2, decodes I-, B- and P-pictures to the same resolution. This may cause inefficient use of system resources. In particular, decoding of a B-picture requires both maximum memory bandwidth and maximum computational complexity. The use of B-pictures, however, is not as important for image quality as I-pictures and P-pictures. Accordingly, the embodiments described herein reallocate hardware resources to obtain high quality I- and P-pictures by using the same hardware resources for these pictures as for B-pictures. For instance, some arrays of data may be processed at full resolution while other arrays of received data may be processed at lower resolutions. In particular, arrays of data associated with I- or P-pictures may be processed at full vertical resolution and half horizontal resolution, whereas arrays of data associated with B-pictures may be processed at that same resolution or lower resolutions.

Accordingly, the following embodiments provide high image quality while yielding low peak memory bandwidth and computational complexity. Thus, the following embodiments are particularly applicable for both primary decoders in small-screen television receivers and auxiliary decoders to provide partial screen features such as split screen and picture-in-picture on large-screen television receivers.

The following embodiments may be applied to input image data for standard input data image sizes to produce an output display of a lower image resolution. For example, the input image data sizes may be for high definition (HD) image sizes (e.g., 1920×1080 interlaced or 1280×720 interlaced/progressive), standard definition (SD) image sizes (720×480 interlaced/progressive), or Common Intermediate Format (CIF) image sizes (360×240 or 252×288). These image sizes may be used to produce an output of a lower resolution image size including 1280×720 interlaced/progressive or 720×480 interlaced/progressive. The lower resolution image size may also include the CIF image size (360×240 or 252×288) or Quarter Common Intermediate Format (QCIF) image size (176×244), which are common data formats for portable or mobile devices having digital image display capabilities.

Furthermore, the following image processing techniques are described for the MPEG-2 data format, however, these techniques can be applied to other standard data formats such as, for example, MPEG-4, Digital Video (DV), JPEG, H261, H263, MPEG-1, or other like data formats as will be explained in further detail below.

Figure 3:
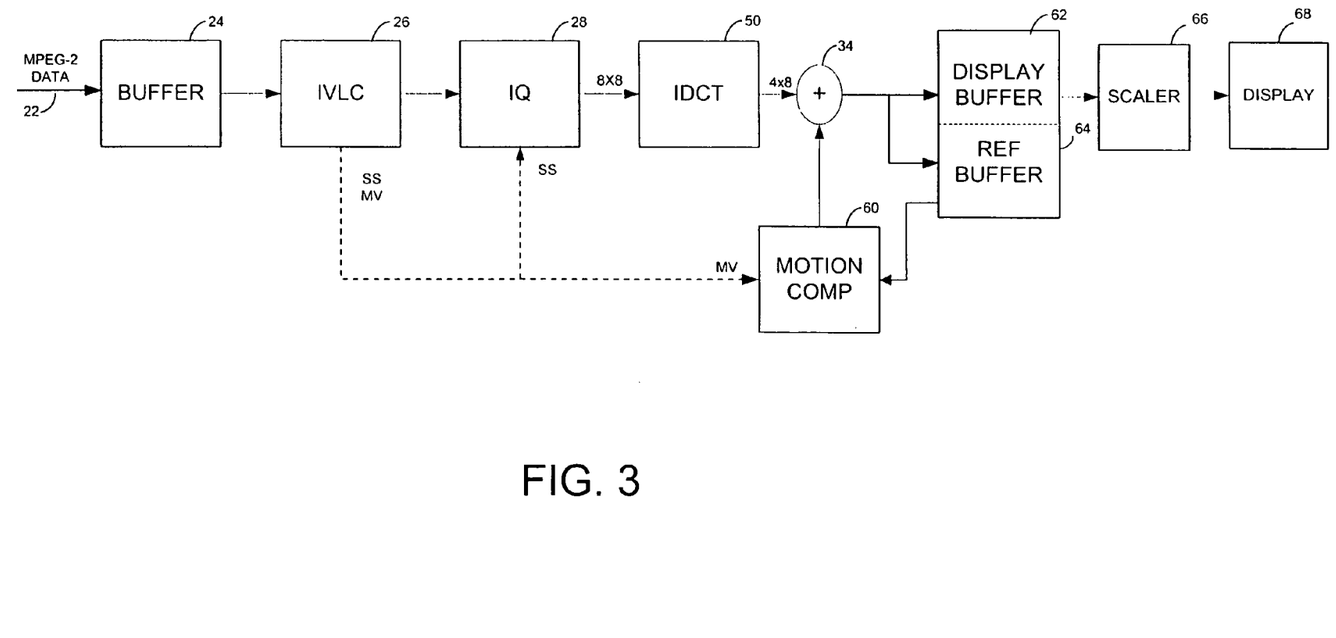
FIG. 3 is a block diagram of a first system for decoding digital image data consistent with the present invention.

FIG. 3 is a functional diagram of a system consistent with the present invention for decoding digital image data. The system of FIG. 3 processes digital image data using methods described below. In a manner similar to the decoder of FIG. 2, the system of FIG. 3 receives digital image data into a buffer 24 and performs inverse variable length coding and inverse quantization at elements 26 and 28, respectively. The system of FIG. 3, however, includes an IDCT element 50 that may selectively perform IDCT processing on only a subset or sub-portion of the DCT coefficients supplied to it in order to produce a lower resolution output with a smaller group of pixels. This type of process is referred to as "down conversion" or "sub-sample IDCT." In one embodiment, IDCT element 50 performs down conversion on an 8×8 array of DCT coefficients by processing a 4×8 sub-portion of the coefficients to produce a 4×8 pixel array. The 4×8 array of coefficients may be chosen, for example, by using the first 4 coefficients per row in the 8×8 array. The produced 4×8 pixel array used in this example would correspond to full vertical resolution and half horizontal resolution. In one embodiment I-, P- and B-pictures are all decoded to produce full vertical resolution and half horizontal resolution output. IDCT element 50 may perform down conversion using algorithms described below.

One type of down conversion algorithm implemented by IDCT element 50 will now be described. IDCT element 50 may, however, implement more than one algorithm during the down conversion process. For example, a process may be performed on coefficients in both the horizontal and vertical direction. This requires implementing a down conversion algorithm in the horizontal direction and in the vertical direction. In one embodiment, IDCT element 50 implements a standard 4-point IDCT algorithm in the horizontal direction and a standard 8-point IDCT algorithm in the vertical direction. The standard 4-point IDCT and standard 8-point IDCT algorithms may be based on a normal type II one-dimensional algorithm as defined below.

$$y(i) = \left(\frac{2}{N}\right)^{1/2} \sum_{m=0}^{N-1} k_m x(m) \cos\left(\frac{(2i+1)m\pi}{2N}\right), n = 0, 1, 2, 3, \ldots N;$$

$$k_m = \begin{cases} \frac{1}{\sqrt{2}} & m == 0 \\ 1 & m \neq 0 \end{cases},$$

wherein $y(i)$ is the pixel output, $x(m)$ is an input coefficient, and N is either 4 or 8 for the 4-point and 8-point IDCT algorithms, respectively. IDCT element 50 then divides the results attained from the algorithms by the square root of two to obtain the correct pixel values.

Alternatively, IDCT element 50 may set one or more coefficients to zero to produce a lower resolution output. For one embodiment, IDCT element 50 may selectively reset coefficients $x(m)$ to zero in order to accommodate insufficient CPU power. This reduces the amount of processing during down conversion. For example, IDCT element 50 may apply an 8-point IDCT algorithm in the vertical direction in which some coefficients $x(m)$ are set to zero if CPU power is not sufficient. In particular, if IDCT element 50 processes an interlaced Frame Picture when macroblock DCT mode is frame, IDCT element 50 may reset coefficients in the vertical direction to zero in order of priority, e.g., $x(5)$, $x(4)$, $x(3)$ and $x(2)$ may be set to zero. In other cases, IDCT element 50 may reset coefficients in the vertical direction to zero in order of priority, e.g., $x(7)$, $x(6)$, $x(5)$ and $x(4)$ may be set to zero. Moreover, as coefficients are selectively set to zero, IVLC element 26 and IQ element 28 may thus ignore coefficients set to zero. This trade-off between conserving CPU power should be balanced with resulting degraded picture quality caused by setting coefficients to zero.

IDCT element 50 supplies the decoded block of data to adder element 34. In the example of FIG. 3, IDCT element 50 outputs a 4×8 pixel array to adder element 34. The operation of adder element 34 depends on the type of incoming block and the type of associated picture. As mentioned above, the blocks in I-pictures are all intra-coded, whereas the blocks in P- and B-pictures may be intra-coded or inter-coded. If the block is intra-coded, the decoded data is complete in and of itself. Thus, adder element 34 supplies data from this incoming block directly to display buffer 62. In addition, if the intra-coded block is from an I- or P-picture, adder element 34 also supplies the data to the reference buffer 64 for storage.

Conversely, B-picture data is not supplied to reference buffer 64 because B-picture data is not used to decode subsequent pictures.

If, on the other hand, the block is inter-coded, the incoming data represents only difference information between an image block of the picture currently being received and a particular block of a reference picture that the decoder has previously received and stored in reference buffer 64. Thus, the particular reference block or blocks must be supplied to the adder element 34 for use with the decoded inter-coded block.

The particular reference picture block or blocks is specified by the motion vector data ("MV"). MV data is supplied to motion compensation element 60. Motion compensation element 60, based on MV data, retrieves data of the specified block from one or more reference pictures stored in reference buffer 64, and supplies it to adder element 34. Data from motion compensation element 60 is combined with incoming decoded data to form a pixel array and the results are stored in display buffer 62. P-picture data is also stored in reference buffer 64. As mentioned above, B-picture data is not supplied to reference buffer 64 because B-picture data is not used to decode subsequent pictures.

Motion compensation element 60 uses MV data and reference information from reference buffer 64 to generate motion compensation data. The MV data is based upon a particular pixel array resolution. However, the resolution of the reference information obtained from reference buffer 64 may not be the same as the resolution associated with the MV data. For instance, in the embodiment described in FIG. 3, the MV data from the MPEG-2 data stream is based on full size reference frames, or 8×8 pixel array per block, whereas the reference information in reference buffer 64 may relate to a lower resolution, e.g. 4×8 pixel array per block. In that case, the reference frame size in the horizontal direction would be half the full size reference frame.

To handle the mismatch between the resolutions associated with the MV data and the reference data, the motion compensation element 60 translates the MV data to the resolution of the data within the reference buffer. Thus, for example, if the motion vector was (6,0) based on an 8×8 pixel array per block, and the data within the reference buffer was based on a 4×8 pixel array per block, the motion compensation element 60 would translate the motion vector data to (3,0). Then, motion compensation element 60 would use this translated MV data to indicate the position of the reference pixel to load reference data.

In some instances, however, the translated MV data does not correspond to an existing pixel within the reference data. In that case, in one embodiment, the motion compensation element 60 up-samples the reference data to supply the missing pixel reference data. Since the adder element 34 combines the data inputs, the motion compensation element 60 down-samples the motion compensation data to yield motion compensation data that has the same resolution as the decoded data from IDCT element 50. Down-sampling supplies pixels when converting from a higher resolution pixel array to a lower resolution pixel array. For instance, in the embodiment described above, motion compensation element 60 down-samples the data to yield a 4×8 block to match the 4×8 block of decoded data from IDCT element 50. This motion compensation operation is provided in more detail below regarding FIG. 4.

Figure 4:
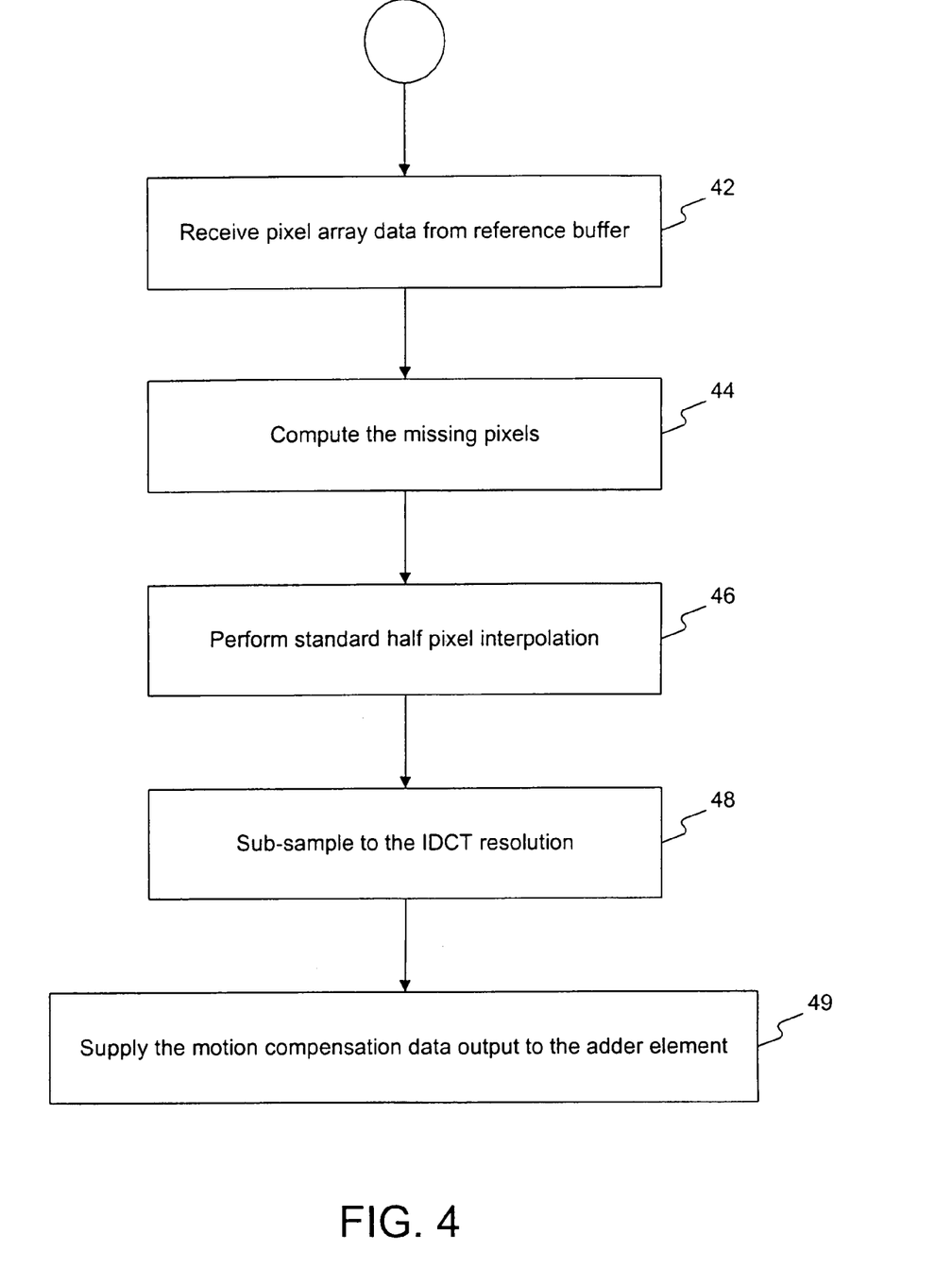
FIG. 4 is a flow chart of a method for providing motion compensation consistent with the present invention.

FIG. 4 is a flow chart of a method for providing motion compensation consistent with the present invention when the motion vector data does not correspond to existing pixel reference data. At stage 42, a motion compensation element receives a pixel array from the reference buffer. If the reference buffer stores 4×8 pixel arrays, the horizontal resolution is half the full vertical resolution such that every other pixel is missing from the received pixel array. The pixel array may be represented as, e.g., P0 M1 P2 M3 P4 M5 P6 M7 P8 M9 P10 . . . , where Pi is the existing pixel, and Mi is the missing pixel. For example, if the motion vector is (3.5, 0) based upon a 8×8 pixel array per block, then the translated motion vector for a 4×8 pixel array is (1.75, 0). In that case, the motion compensation element first determines the missing pixels at the half positions for row 0. The motion compensation element up-samples, or computes the missing pixels, M(i) from the existing pixels at stage 44. The missing pixels may be computed with the following formula:

$$M_{i+1}=(9*P_i+9*P_{i+2}-P_{i-2}-P_{i+4}+8)/16.$$

Second, motion compensation element performs a standard MPEG half pixel interpolation to compute missing pixels at the quarter positions for that row at stage 46. The pixels may be computed from the existing pixels and the calculated pixels at the half positions using the following formula:

$$(M3+P4+1)/2, (P4+M5+1)/2, (M5+P6+1)/2, (P6+M7+1)/2, (M7+P8+1)/2, (P8+M9+1)/2, (M9+P10+1)/2, \text{ and } (P10M11+1)/2.$$

Motion compensation element then sub-samples the pixel data to a resolution associated with the IDCT data results at stage 48. In one embodiment, every other pixel may be dropped to produce pixel data as shown below.

$$(M3+P4+1)/2, (M5+P6+1)/2, (M7+P8+1)/2 \text{ and } (M9+P10+1)/2.$$

At stage 49, the motion compensation element supplies the motion compensation data to the adder element.

The method for providing motion compensation as depicted in FIG. 4 may be condensed into one stage. For instance, stages 44, 46 and 48 may be merged into a single stage because the MPEG standard half pixel interpolation and up-sample calculation can be merged into a single interpolation. Stage 44, computing the missing pixels, and stage 46, performing the half pixel interpolation may be merged as indicated below.

$$(M_{i+1}+P_{i+2}+1)/2 \approx (9*P_i+25*P_{i+2}-P_{i+4}+16)/32$$

Although the rounding of the left side is slightly different from the right side, the merge can cut the complexity of the motion compensation, thereby reducing the amount of processing.

Assuming, as in the example, that some of the pictures are processed to 4×8 pixel array per block resolution, buffers 62 and 64 (FIG. 3) may be sized according to the amount of data expected. Alternatively, buffers 62 and 64 may be sized to contain pixel data for an entire decoded picture including full resolution of the original image to accommodate the occasion when some arrays are processed in full resolution. When the last block of incoming digital image data has been decoded and stored, the pixel data from display buffer 62 is supplied to a scaler element 66 which scales the pixel data stored in display buffer 62 to full display size. Scaling may be performed using any available scaling techniques that are well known to those skilled in the art. Common methods of scaling may be found in Castleman, 1996, "Processing Sampled Data" *Digital Image Processing*, 12:253-279. The scaled pixel data is then supplied to a display element 68.

Figure 5:
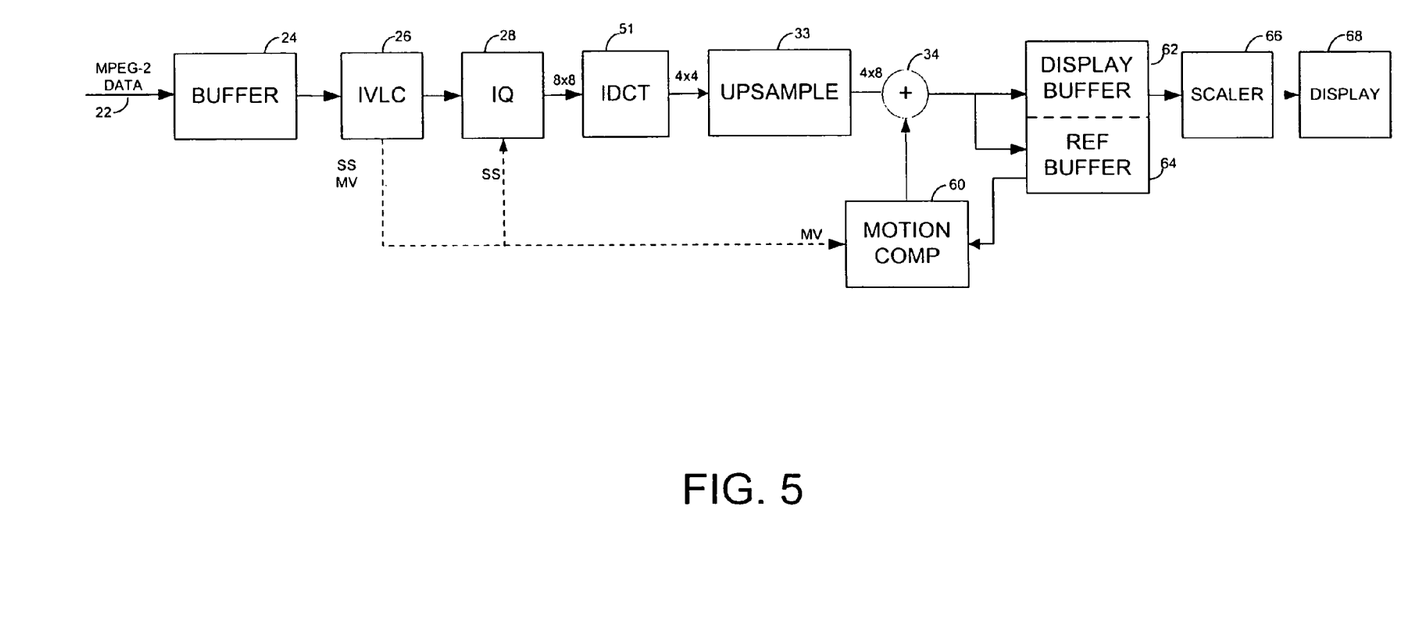
FIG. 5 is a block diagram of a second system for decoding digital image data consistent with the present invention.

FIG. 5 shows an alternative system consistent with the present invention, suitable for applications in which processor resources are more limited than memory resources. In the system of FIG. 5, I-picture and P-picture data may be in the reduced resolution manner (4×8 pixel array) described above regarding FIG. 3. FIG. 5 describes an exemplary system where B-pictures may be processed in a reduced resolution manner (4×4 pixel array) and then up-sampled to a higher resolution (4×8 pixel array). Similar to FIG. 3, the output of IQ element 28 is an 8×8 array of DCT coefficients.

As shown in FIG. 5, IDCT element 51 may receive, for example, an 8×8 DCT coefficient array and produce a 4×4 pixel array. IDCT element 51 may process a subset or sub-potion of the 8×8 DCT coefficients to produce the 4×4 pixel array. In one embodiment, IDCT element 51 receives an 8×8 DCT coefficient matrix and performs down conversion by processing a 4×8 sub-portion of the received coefficient array to produce a 4×4 pixel array. The 4×8 sub-portion may be chosen by, for example, using the first 4 coefficients per row in the 8×8 array. The produced 4×4 pixel array would yield a resolution of one-half the original resolution in both the vertical and horizontal dimensions. Processing a 4×8 array of DCT coefficients to produce a 4×4 pixel array allows use of a significantly less powerful IDCT element. The resulting 4×4 pixel array is then processed by an up-sample element 33 in a manner well known by those skilled in the art to produce a higher resolution pixel array such as, for example, a 4×8 pixel array. The 4×8 pixel array is then processed by elements 60, 34, 62, 64, 66 and 68 of the system of FIG. 5 in the same manner as described previously regarding FIG. 3.

As shown in FIG. 5, in one embodiment, IDCT element 51 receives an 8×8 DCT coefficient matrix and performs down conversion by processing a 4×8 sub-portion of the received coefficients to produce a 4×4 pixel array output. IDCT element 51 may perform down conversion using one or more algorithms. For example, as described above in FIG. 3, a process may be performed for coefficients in both the horizontal and vertical direction. In one embodiment, IDCT element 51 performs a standard 4-point IDCT algorithm, as described above, in the horizontal direction. In the vertical direction, IDCT element 51 can process an interlaced Frame Picture when macroblock DCT mode is frame using, for example, an 8-point one-dimensional reduced-IDCT algorithm. In other cases, a 4-point one-dimensional reduced-IDCT algorithm can be used in the vertical direction. The 8-point and 4-point one-dimensional algorithms are described below.

The 8-point one-dimensional reduced-IDCT multiplies the 8 point coefficient array X(n) by a 4×8 matrix 'A' of constants to produce a pixel output, Y(i). In one embodiment, constant matrix 'A' is defined as follows:

$$A(m, n) = \begin{bmatrix} 4096 & 4756 & 1448 & 871 & 1567 & 1303 & 3496 & 2912 \\ 4096 & 4756 & -1448 & -871 & -1567 & -1303 & -3496 & -4511 \\ 4096 & -3279 & -1448 & 871 & -1567 & 1303 & -3496 & 4511 \\ 4096 & -4756 & 1448 & -871 & 1567 & -1303 & 3496 & -2912 \end{bmatrix}$$

Thus, the 8-point one-dimensional reduced IDCT algorithm is defined as follows:

$$Y(i) = \frac{1}{8192} \sum_{n=0}^{7} X(n) \cdot A(i, n)$$

For the 4-point one-dimensional reduced-IDCT algorithm, the last coefficients of the 8 point array X(n) are dropped to produce a 4-point array. A standard 4-point IDCT algorithm, as described above, uses the coefficients in the vertical direction to generate pixel output. IDCT element 51 then divides the results attained by two to obtain the correct pixel values.

Figure 6:
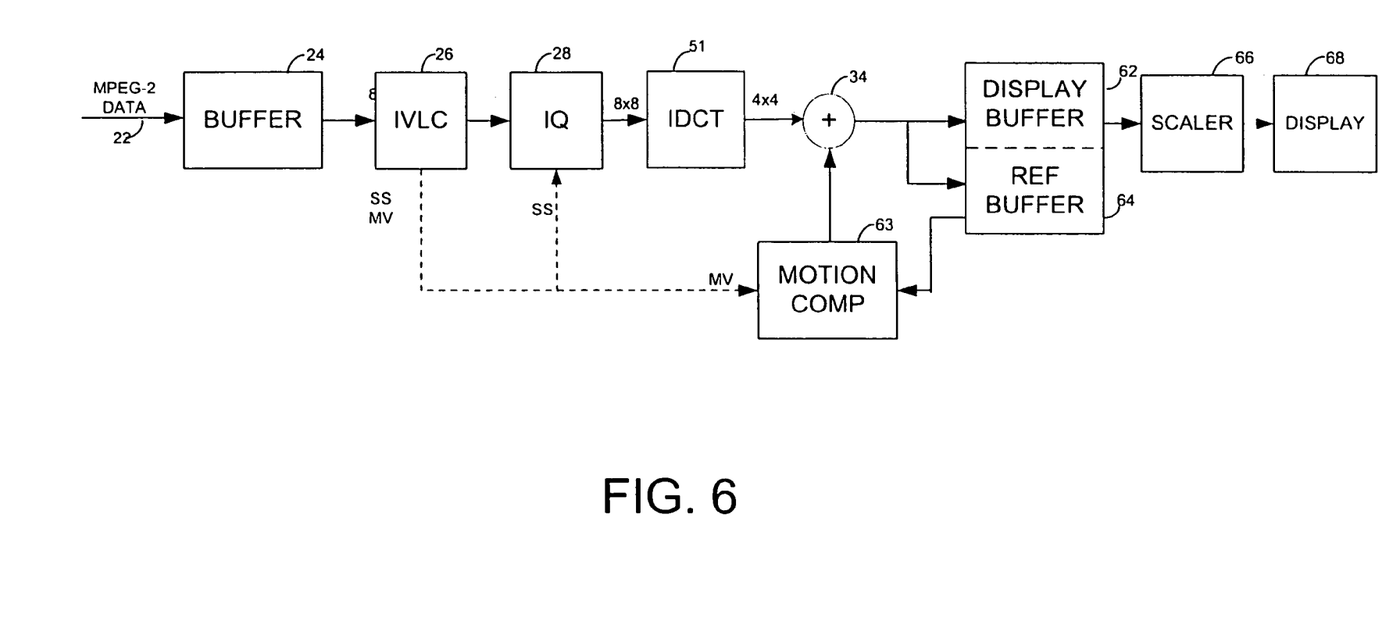
FIG. 6 is a block diagram of a third system for decoding digital image data consistent with the present invention.

FIG. 6 shows another alternative system consistent with the present invention that is suitable for applications in which both processing power and memory must be restricted. The system of FIG. 6 generally processes digital image data in the same manner as described above with respect to the systems of FIGS. 3 and 5. In particular, DCT coefficients supplied by inverse quantization element 28 may be processed by IDCT element 51 to yield a 4×4 array of pixel data in the same manner as discussed above with respect to FIG. 5. However, in the system of FIG. 6, the 4×4 pixel data is not up-sampled. Data from the motion compensation element 63 may be processed in the same manner as described above with respect to FIG. 3.

The 4×4 array of pixel data is combined with data from motion compensation element 63 to form a 4×4 array of pixel data and is stored in a display buffer 62. Display buffer 62 then may have a size corresponding to one-half resolution in both the vertical and horizontal dimensions.

In one embodiment I- and P-pictures are processed in the reduced resolution manner described above with respect to FIG. 3. Consequently, the reference data contained within the reference buffer 64 is comprised of 4×8 pixel arrays. B-pictures, on the other hand, may be processed in the reduced resolution manner described above with respect to FIG. 6. Consequently, IDCT element 51 yields 4×4 arrays of B-picture pixel data. In this case, as in FIG. 3, the motion compensation element 63 retrieves 4×8 pixel per block reference data and performs the standard motion prediction with the motion vector data and the retrieved reference data. However, in this embodiment, motion compensation element 63 then down-samples the motion compensation data to yield a 4×4 block to match the 4×4 block of decoded B-picture data from IDCT element 51.

When the last block of picture data has been decoded and stored, display element 68 matches the resolution of the picture output. For instance, in this example, display element 68 drops every other line of the 4×8 I- and P-picture data in display buffer 62 to match the 4×4 resolution of B-picture output. In this way, the display quality of I- and P-pictures resembles the quality of the B-pictures. Pixel data is then output from display buffer 62 and processed by scaler element 66 in both horizontal and vertical dimensions to the appropriate display size. It is then supplied to display element 68.

Figure 7:
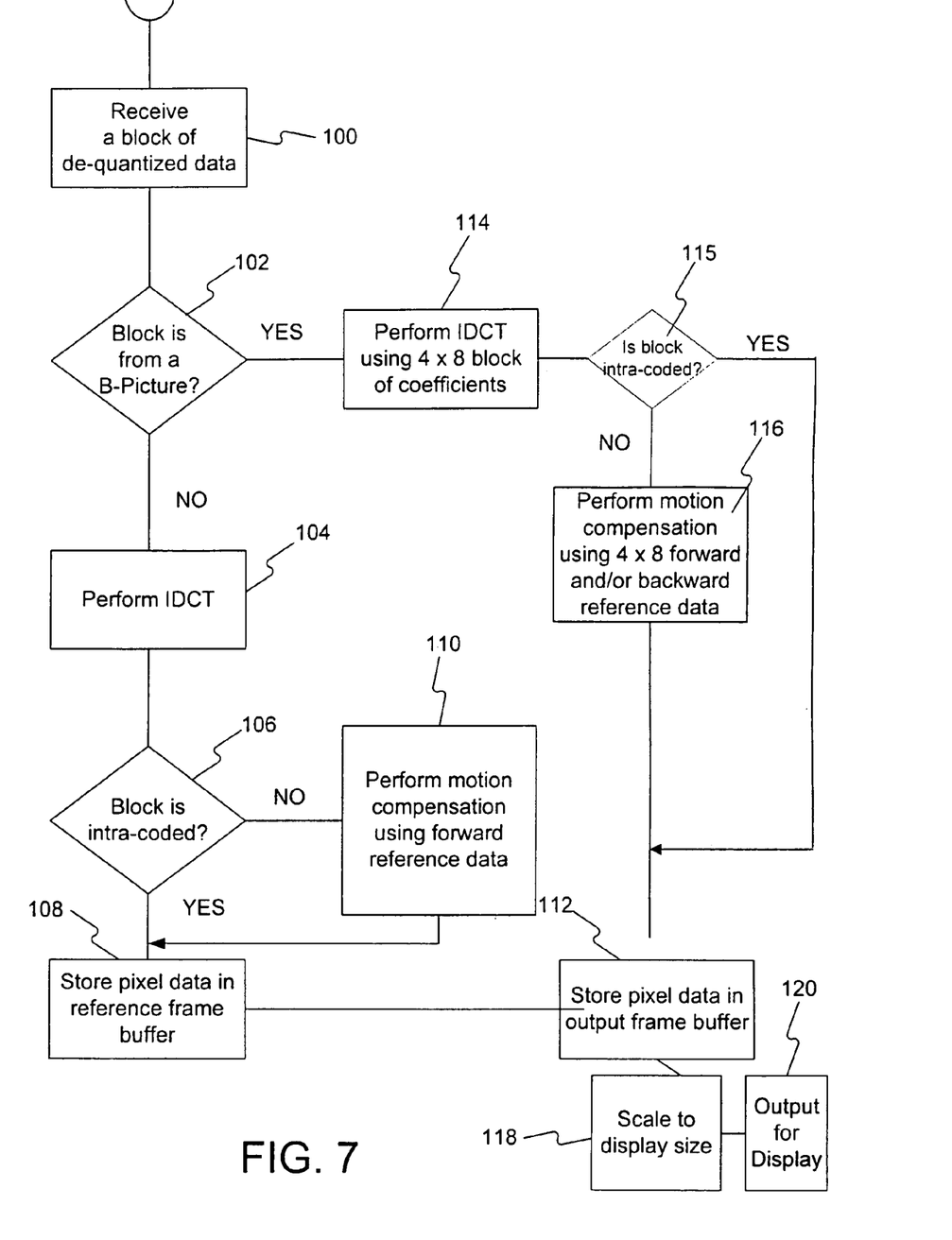
FIG. 7 is a flow chart of a first method for decoding digital image data consistent with the present invention.

FIG. 7 is a logic flow diagram of a method consistent with the invention. In particular, FIG. 7 shows a method that may be used by the system of FIG. 3. At stage 100, a block of dequantized data is received. In one example, the block of dequantized data is 8×8 in size. It is determined, at stage 102, whether the block is from a B-picture. If not, the data is from either a P-picture or an I-picture. If the data is from a B-picture, the IDCT processes a sub-portion of the DCT coefficients, for example, a 4×8 sample, to obtain a 4×8 block of pixel data (stage 114). It is determined, at stage 115, whether the block is intra-coded. If the block is intra-coded, the process continues to stage 112. If the block is not intra-coded it is inter-coded. In that case, the 4×8 block of pixel data is added to reference data obtained from a reference buffer (stage 116). The reference data may describe either a preceding or upcoming frame, or both. The resulting 4×8 block of pixel data is stored in an output frame buffer, or display buffer (stage 112). The data is then scaled to the size of the display (stage 118), and output for display (stage 120).

If it is determined at stage 102 that the data is not from a B-picture, then the data is from an I- or P-picture. IDCT may be performed on a sub-portion of the coefficients, such as a 4×8 sub-portion (stage 104). If the resulting pixel data is intra-coded (stage 106), the block of pixel data is stored at stage 108 in a reference frame buffer. If it is determined at stage 106 that the data is not intra-coded, it is inter-coded. Thus, motion compensation is performed at stage 110 using forward reference frame data from a reference frame buffer. For both I- and P-pictures, the pixel data is then stored in a reference frame buffer (stage 108). Both the I-picture data and P-picture data are stored at stage 112 in an output frame buffer, otherwise called a display buffer. When the last block from the current picture has been processed, data is then scaled at stage 118 to appropriate display size and then provided as output for display at stage 120.

Figure 8:
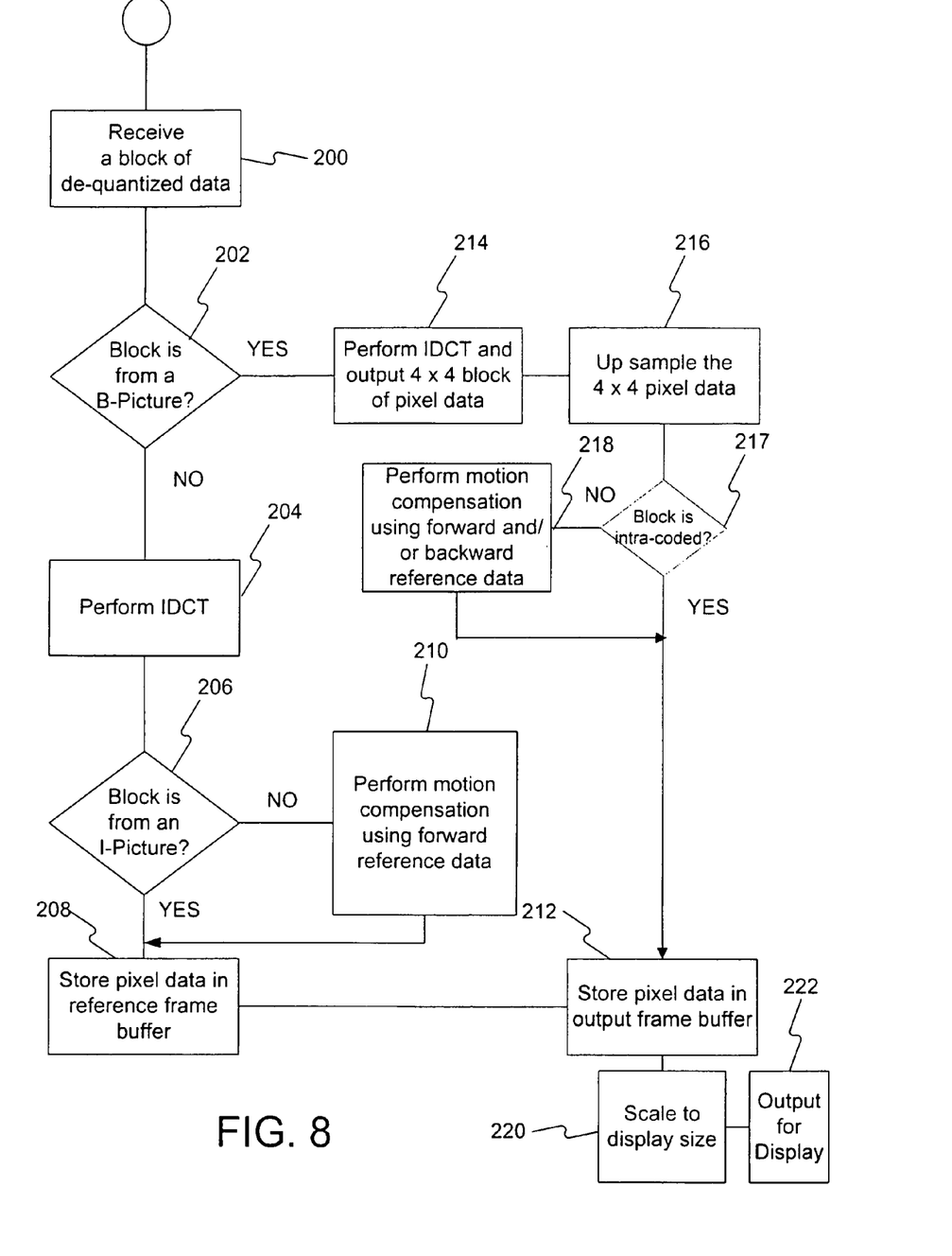
FIG. 8 is a flow chart of a second method for decoding digital image data consistent with the present invention.

Another method for decoding image data consistent with the present invention is shown in FIG. 8. The method of FIG. 8 may be performed, for example, by the system of FIG. 5. At stage 200, a block of dequantized data is received. It is determined at stage 202 if the block is from a B-picture. If not, the block is from an I- or P-picture. In that case, IDCT processing may be performed at stage 204 using a 4×8 block of DCT coefficients to obtain resulting pixel data. It is determined at stage 206 if the block is intra-coded. If so, the 4×8 block of pixel data is stored at stage 208 in a reference frame buffer. If it is determined at stage 206 that the data is not intra-coded, it is inter-coded. Thus, motion compensation is performed at stage 210 using forward reference frame data from a reference frame buffer. For both I- and P-pictures, the pixel data is then stored in a reference frame buffer (stage 208). Both the I-picture data and P-picture data are stored at stage 212 in an output frame buffer, otherwise called a display buffer.

If it is determined at stage 202 that the data is from a B-picture, IDCT processing may be performed to produce a 4×4 block of pixel data using, for example, a 4×4 array of DCT coefficients (stage 214). The resulting 4×4 block of pixel data is then up-sampled to form a 4×8 array of data (stage 216). It is determined, at stage 217, whether the block is intra-coded. If the block is an intra-coded, the process continues to stage 212. If the block is not intra-coded, it is inter-coded. In that case, motion compensation is performed using forward, backward, or both forward and backward reference frame data obtained from a reference frame buffer (stage 218). The motion compensated data is then stored in an output frame buffer (stage 212). When the last block of data for the current picture has been processed, the pixel data in the output frame buffer is then scaled at stage 220 to appropriate display size and output for display at stage 222.

Figure 9:
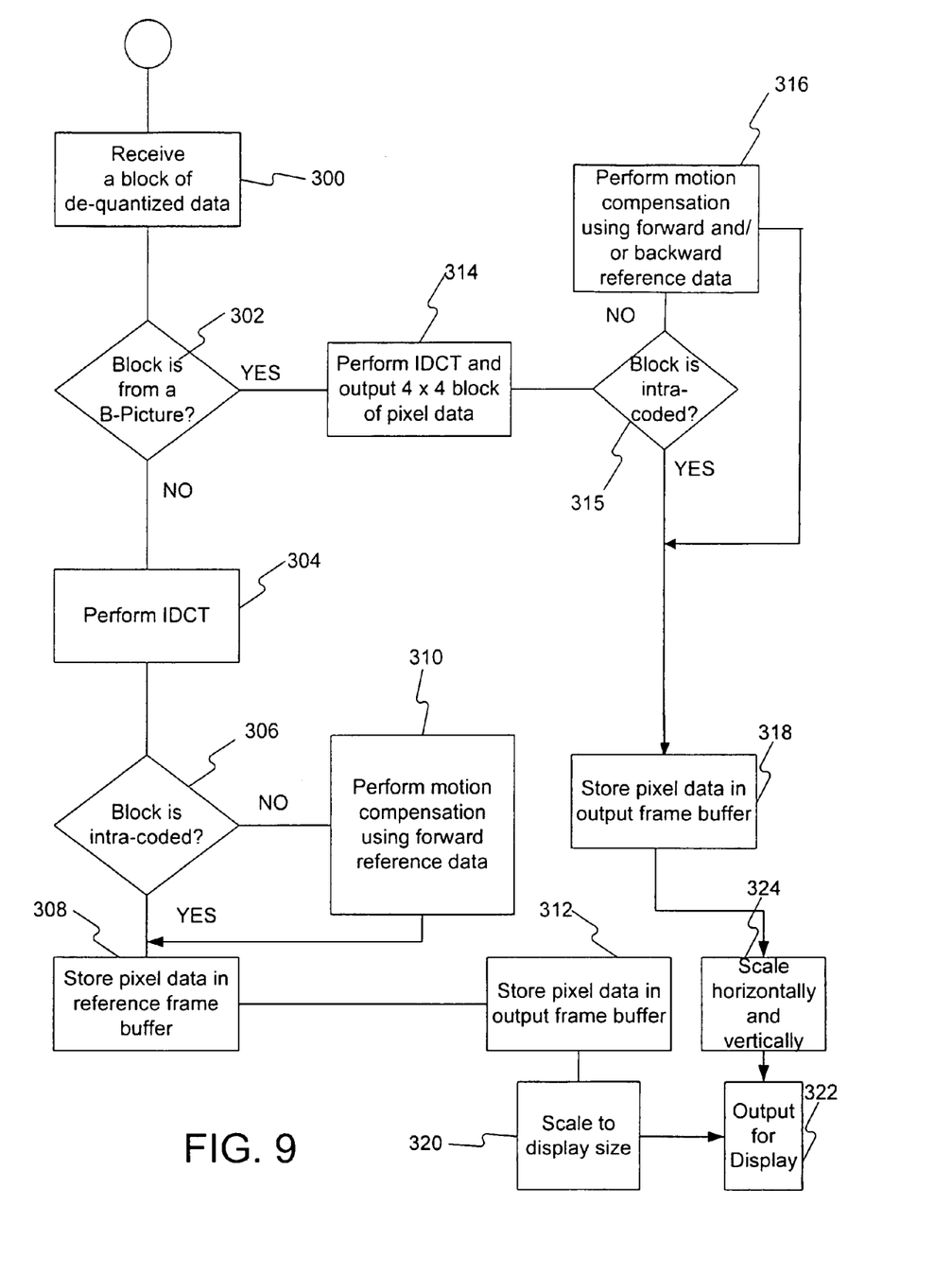
FIG. 9 is a flow chart of a third method for decoding digital image data consistent with the present invention.

FIG. 9 is a logic flow diagram of another method for decoding image data consistent with the present invention. The method of FIG. 9 may be performed, for example, by the system of FIG. 6. At stage 300, a decoder receives a block of dequantized data. It is determined at stage 302 if the block is from a B-picture. If not, the data is from either a P-picture or an I-picture. IDCT processing is performed at stage 304 to produce, for example, a 4×8 pixel array, using, for example, a 4×8 array of DCT coefficients. It is determined at stage 306 if the block is intra-coded. If so, the resulting array of pixel data is stored in a reference frame buffer at stage 308. If the block is not intra-coded, as determined at stage 306, it is inter-coded. Accordingly, motion compensation is performed at stage 310 using forward reference frame data. The motion compensated data is then stored at 308 in a reference frame buffer. The I-picture data and P-picture data are stored at stage 312 in an output frame buffer, otherwise called a display buffer.

If the data is from a B-picture, as determined at stage 302, IDCT processing is performed at stage 314 to produce a 4×4 array of pixel data using, for example, a 4×4 array of DCT coefficients. It is determined, at stage 315, whether the block is intra-coded. If the block is intra-coded, the process continues to stage 318. If the block is not intra-coded it is inter-coded. In that case, motion compensation is then performed using data from forward and backward reference frame buffers at stage 316. The 4×4 pixel data is then stored in an output frame buffer at stage 318.

When the last block of the picture has been processed, output data for complete I- and P-pictures is then scaled in the horizontal dimension to appropriate display size at stage 320 and output for display at stage 322. In a preferred embodiment, I- and P-pictures are scaled to the same resolution as B-picture output before they are scaled to the appropriate display size. When the last block of a B-picture has been processed, pixel data, stored as 4×4 blocks, in an output frame buffer is then scaled at stage 324 in both the horizontal and vertical dimensions to appropriate display size and output for display at stage 322.

Figure 10:
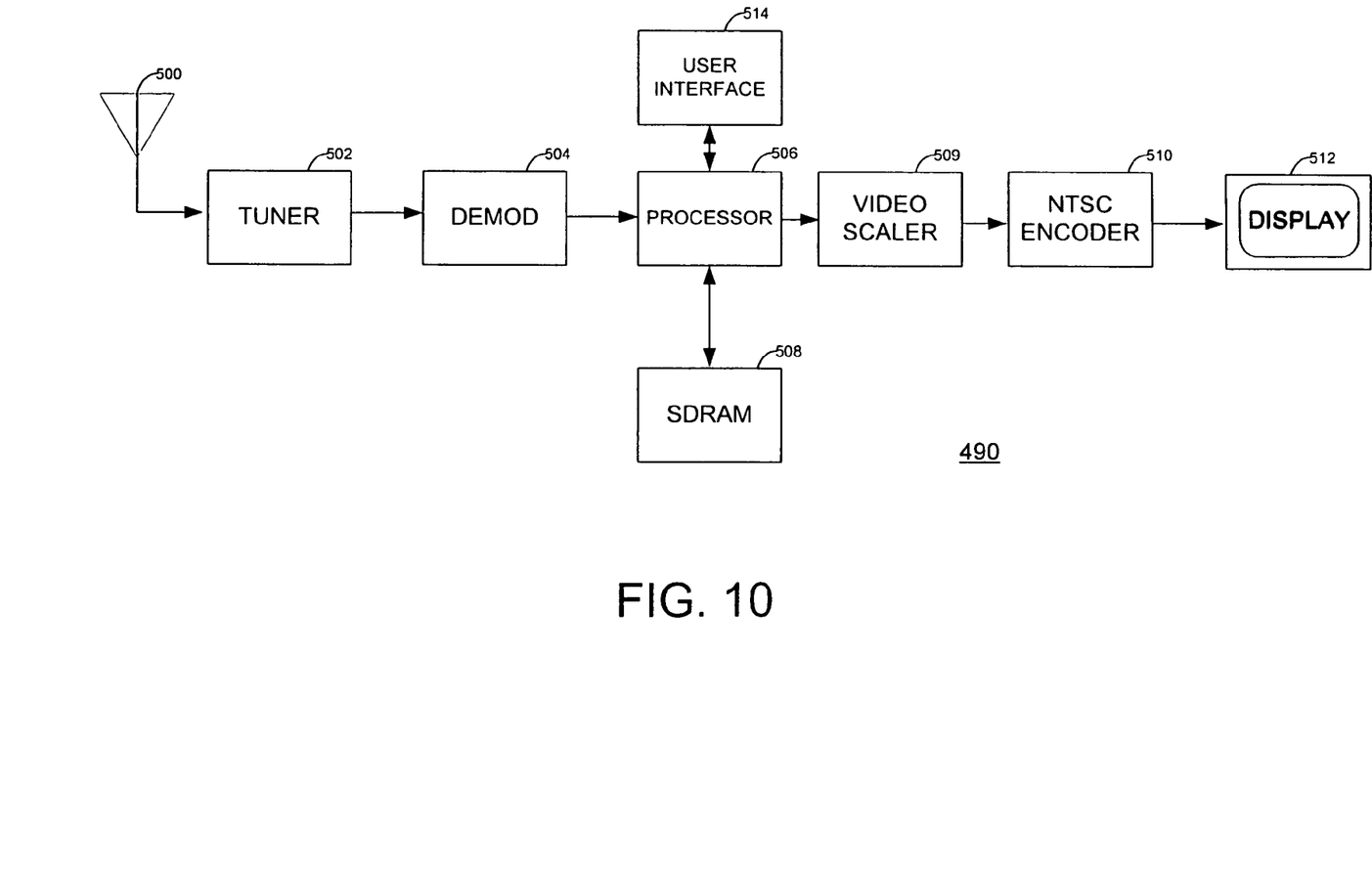
FIG. 10 is a block diagram of a digital television receiver incorporating a digital image decoder consistent with the present invention.

FIG. 10 is a block diagram of a digital television receiver 490 consistent with the present invention. An antenna 500 or a cable connection provides an RF television broadcast signal to an RF tuner 502. Tuner 502 selects a desired broadcast channel, as indicated by the viewer, and supplies the selected RF signals to a demodulator 504. Demodulator 504 extracts digital encoded video signals from the radio frequency (RF) signals and supplies the encoded video signals in an ITU-R BT.601/656 format to a multimedia processor 506. Processor 506 is connected to a memory element 508 which preferably comprises a static dynamic random access memory (SDRAM).

Processor 506 provides decoded digital video signals to a flexible video scaler 509 which in turn provides input to an national television standards committee (NTSC) encoder 510. Encoder 510 converts the decoded video signals to standard NTSC format analog signals for display on a television monitor 512. Receiver 490 is controlled by a user interface component 514 which may include, for example, an infrared handheld transmitter and an infrared receiver to permit a user to control receiver 490. In the preferred embodiment, functions of tuner 502, demodulator 504, processor 506, and encoder 510, are performed by a MAP-CA processor commercially available from Equator Technologies, Inc. of Campbell, Calif., which executes the methods of FIGS. 7, 8, and 9 from instructions stored in a memory thereof.

In the above description, IDCT and motion compensation processing techniques are implemented for the MPEG-2 data format, but may be implemented for other data formats. For example, the above algorithms for IDCT and motion compensation processing may be implemented with data formats such as, for example, the H261 H263, MPEG-1, and MPEG4 having half pixel motion vectors formats. Furthermore, the above IDCT algorithms may be implemented for the data formats in the JPEG or DV data formats in which motion compensation processing is not necessary. In addition, similar IDCT processing techniques may be implemented on MPEG-4 data formats having quarter pixel motion vectors.

Furthermore, although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 7-9. No particular programming language has been indicated for carrying out the various procedures described above because it is considered that the operations, stages and procedures described above and illustrated in the accompanying drawings are sufficiently disclosed to permit one of ordinary skill in the art to practice the instant invention. Moreover, there are many computers and operating systems that may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. An apparatus for displaying an image on a portion of a display, that portion being a subsection of the display and having a lower resolution than the display, comprising:
    means for receiving encoded image data comprising I-picture, P-picture, and B-picture data;
    means for performing IDCT decoding on I-picture and P-picture data at a first resolution and on B-picture data at a second resolution, the second resolution being lower than the first resolution;
    means for performing motion compensation processing on the decoded P-picture and B-picture data;
    means for scaling the decoded and motion compensated image data based on the size of the portion of the display; and
    means for displaying the scaled pixel data on the portion of the display.

2. The apparatus as recited in claim 1, wherein the first resolution comprises full vertical resolution and one-half horizontal resolution.

3. The apparatus as recited in claim 1, wherein the second resolution comprises one-half vertical resolution and one-half horizontal resolution.

4. The apparatus as recited in claim 1, wherein means for performing motion compensation processing comprises:
    means for obtaining motion vector data;
    means for determining if the motion vector data specifies a pixel position that does not have a corresponding pixel within the picture data;
    means for, if the motion vector data has a missing pixel, up-sampling the picture data from its scaled resolution to compute a replacement pixel; and
    means for down-sampling the picture data with the replacement pixel to its scaled resolution.

5. An apparatus for displaying an image on a portion of a display, that portion being a subsection of the display and having a lower resolution than the display, comprising:
    means for receiving an array of DCT coefficients representing a block of image data of one of a plurality of types of pictures;
    means for performing IDCT on a sub-portion of the DCT coefficients to obtain a block of pixel data equal in size to the sub-portion if the block of image data represents a first type of picture;
    means for performing motion compensation on the block of pixel data to obtain a second block of pixel data;
    means for scaling the second block of pixel data based on a size of the portion of the display; and
    means for displaying the scaled pixel data on the portion of the display.

6. An apparatus for decoding image data comprising:
    means for receiving encoded image data comprising I-picture, P-picture, and B-picture data;
    means for performing IDCT decoding on I-picture data at a first resolution;
    means for scaling the decoded I-picture data based on a display size, and outputting the scaled I-picture data for display;
    means for performing IDCT decoding on P-picture data at the first resolution;
    means for performing motion compensation processing on the decoded P-picture data;
    means for scaling the motion-compensated P-picture data based on the display size, and outputting the scaled P-picture data for display;
    means for performing IDCT decoding on B-picture data at a second resolution, the second resolution being lower than the first resolution;
    means for performing motion compensation processing on the decoded B-picture data; and
    means for scaling the motion-compensated B-picture data to the display size; and
    outputting the scaled B-picture data for display.

7. An apparatus for decoding image data comprising:
    means for receiving encoded image data comprising I-picture, P-picture, and B-picture data;
    means for performing IDCT decoding on I-picture and P-picture data at a first resolution and on B-picture data at a second resolution, the second resolution being lower than the first resolution;
    means for performing motion compensation processing on the decoded P-picture and B-picture data;
    means for scaling the decoded and motion compensated image data based on a display size; and
    means for outputting the scaled image data for display.

8. A system for or displaying an image on a portion of a display, that portion being a subsection of the display and having a lower resolution than the display, comprising:
    an IDCT decoder for performing IDCT decoding on I-picture and P-picture data at a first resolution and on B-picture data at a second resolution, the second resolution being lower than the first resolution;
    a processor for performing motion compensation processing on the decoded P-picture and B-picture data; and
    a video scaler for scaling the decoded and motion compensated I-picture, P-picture, and B-picture data based on the size of the portion of the display; and
    a video unit for displaying the scaled pixel data on the portion of the display.

9. A system for displaying an image on a portion of a display, that portion being a subsection of the display and having a lower resolution than the display, comprising:
    an IDCT decoder for receiving an array of DCT coefficients representing a block of image data of one of a plurality of types of pictures and performing IDCT on a sub-portion of the DCT coefficients to obtain a block of pixel data equal in size to the sub-portion if the block of image data represents a first type of picture;
    a processor for performing motion compensation on the block of pixel data to obtain a second block of pixel data;
    a video scaler for scaling the second block of pixel data based on a size of the portion of the display; and
    a video unit for displaying the scaled pixel data on the portion of the display.

10. A system for decoding image data comprising:
an IDCT decoder for
  receiving encoded image data comprising I-picture, P-picture, and B-picture data;
  performing inverse IDCT decoding on I-picture data at a first resolution;
  performing IDCT decoding on P-picture data at the first resolution; and
  performing IDCT decoding on B-picture data at a second resolution, the second resolution being lower than the first resolution;
a processor for
  performing motion compensation processing on the decoded P-picture data; and
  performing motion compensation processing on the decoded B-picture data; and
a video scaler for
  scaling the decoded I-picture data based on a display size, and outputting the scaled I-picture data for display;
  scaling the motion-compensated P-picture data based on the display size, and outputting the scaled P-picture data for display; and
  scaling the motion-compensated B-picture data to the display size, and outputting the scaled B-picture data for display.

11. A system for decoding image data comprising:
an IDCT decoder for performing IDCT decoding on I-picture and P-picture data at a first resolution and on B-picture data at a second resolution, the second resolution being lower than the first resolution;
a processor for performing motion compensation processing on the decoded P-picture and B-picture data;
a video scaler for scaling the decoded and motion compensated I-picture, P-picture, and B-picture data based on a display size; and
a video unit for outputting the scaled data for display.

* * * * *

UNITED STATES PATENT AND TRADEMARK OFFICE
CERTIFICATE OF CORRECTION

| | | |
|---|---|---|
| PATENT NO. | : 8,045,622 B2 | Page 1 of 1 |
| APPLICATION NO. | : 11/787808 | |
| DATED | : October 25, 2011 | |
| INVENTOR(S) | : Jason Naxin Wang et al. | |

It is certified that error appears in the above-identified patent and that said Letters Patent is hereby corrected as shown below:

On the Title page, item (60), the priority information is missing. Insert --This patent claims priority back to Application No. 60/254,572 filed December 12th, 2000.--

In the Specification

Column 1, starting at line 5, to column 1, line 13 replace the priority information with the following text:

"This application is a continuation of U.S. Application No. 10/014,689 (Now U.S. Patent 7,227,895) entitled 'System and Method for Generating Decoded Digital Video Image Data', filed December 11th 2001, which claims the benefit of U.S. Provisional Application No. 60/254,572 entitled 'System and Method for Generating Decoded Video Image Data', filed December 12th, 2000."

Signed and Sealed this
First Day of September, 2015

Michelle K. Lee
*Director of the United States Patent and Trademark Office*